E. D. TILLYER.
LENS.
APPLICATION FILED DEC. 27, 1916.
1,340,189. Patented May 18, 1920.
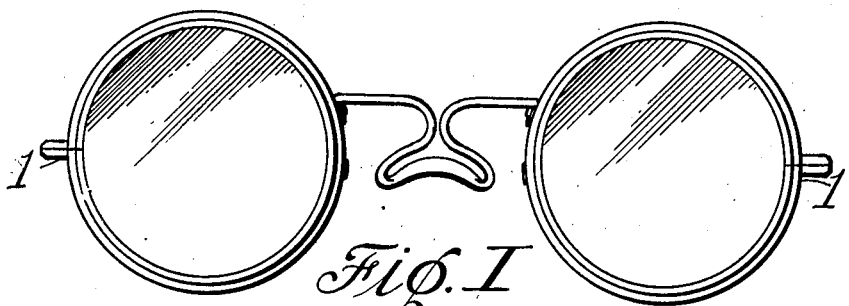
Fig. I
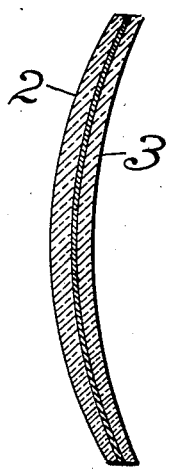
Fig. II
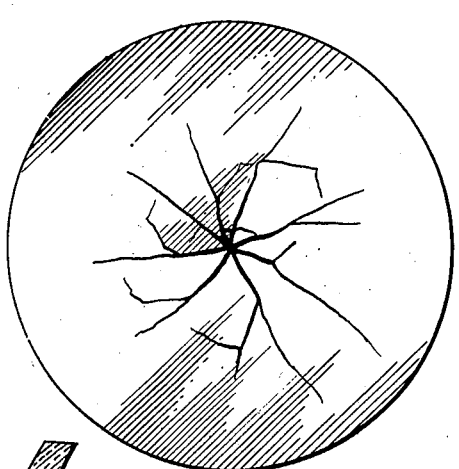
Fig. III
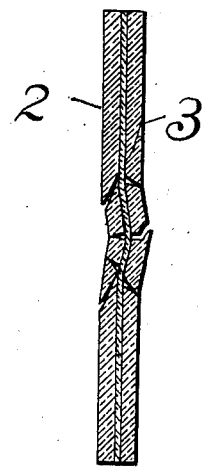
Fig. IV
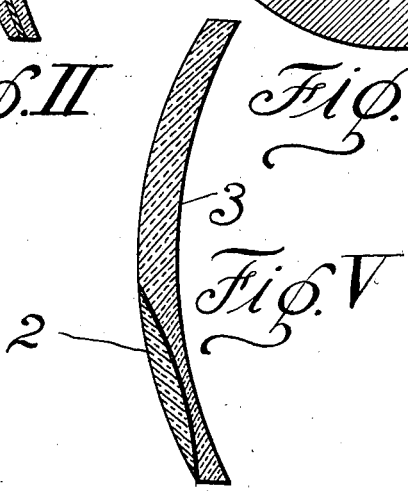
Fig. V
INVENTOR
Edgar D. Tillyer
BY
H. H. Styll, H. K. Parsons
ATTORNEYS

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS.

1,340,189.　　　　Specification of Letters Patent.　　Patented May 18, 1920.

Application filed December 27, 1916. Serial No. 139,079.

*To all whom it may concern:*

Be it known that I, EDGAR D. TILLYER, a citizen of the United States, residing at Southbridge, in the county of Worcester and State of Massachusetts, have invented certain new and useful Improvements in Lenses, of which the following is a specification.

My invention relates to improvements in lenses and has particular reference to ophthalmic or similar lenses adapted to be constructed from two or more parts.

One of the leading objects of the present invention is the provision of an improved construction of ophthalmic lens composed of a plurality of parts, which parts shall be united in an extremely firm and secure manner and in which the medium serving to connect the parts of the lens shall be invisible or imperceptible for all practical purposes.

A further object of the present invention is the provision of a structure of this nature in which the parts are united by an adhesive or connecting substance having extreme toughness or pliability to allow a certain expansion and contraction of the parts held thereby relative to the retaining medium itself and which will aid in reinforcing the parts against breaking or shattering.

A further object of the invention is the provision of an adhesive which will satisfactorily grip or engage polished surfaces, such as glass or the like, and serve to satisfactorily unite such surfaces, which adhesive will be transparent when in a thin film and shall possess extreme elasticity or yieldability coupled with toughness or resistance to breaking and a maximum of gripping or adhesive property.

Other objects and advantages of my improved construction should be readily apparent by reference to the following specification taken in connection with the accompanying drawings forming a part thereof, and it will be understood that I may make any modifications in the specific details of construction shown and described within the scope of the appended claims without departing from or exceeding the spirit of my invention.

Figure I represents a front view of an ophthalmic mounting equipped with my improved lenses.

Fig. II represents a transverse sectional view taken through one of the lenses.

Fig. III represents a front view of one of my lenses in shattered condition.

Fig. IV represents a sectional view therethrough.

Fig. V represents a sectional view of a different construction of my improved lens.

In the drawings, the numeral 1 designates a frame serving to hold a pair of my improved lenses which I have shown in the several views as consisting of the two overlying parts 2 and 3 which may be either coextensive throughout the lens, as in the form illustrated in Figs. II and IV for example, intended particularly for protection purposes, or may be but partially coextensive, as the member 2, set into a countersink or recess in the member 3, or being smaller in size and merely secured to the face of the member 3 or the like as will be understood by reference to Fig. V.

It is a universally known fact that glass has considerable resiliency or elasticity although no great power of resistance to sudden shocks. It is, therefore, desirable in the uniting of glass parts one to the other to employ for this purpose a cement which will be firm and solid, which will securely retain the parts, will be clearly transparent to in nowise interfere with the optical efficiency of the parts, which will be capable of expansion and contraction and yielding to correspond to that of the glass, and which in addition will have sufficient toughness to resist shocks which will break the glass and tend to hold the broken pieces together rather than become loosened from the glass by a sharp blow or the like.

I realize that in the past certain gums or the like have been employed for the purpose of uniting glass to glass, but that considerable difficulty has been experienced in their use due to their lack of toughness or durability and the fact that they readily become cracked or split apart and fail to hold the parts when subjected to any bending or twisting strain, even though the actual tenacity or grip of the adhesive is sufficient to resist direct separating pull. Likewise, I am aware that attempts have been made in the past to use celluloid or the like on account of its toughness for the uniting of lenses or the like, but I appreciate that celluloid in itself is harmful and injurious to the eye of the user and is, therefore, not suitable for this purpose.

It is, therefore, the purpose of my invention to provide a cement which will be sufficiently tough to prevent flying of the fragments in the case of a blow against the lens, as is illustrated in Figs. III and IV for example, of my patent drawing, and at the same time which is sufficiently optically perfect to render it capable of employment in connection with the securing together of the two parts of a bifocal lens, for example, in which the parts must be united in a substantially optically perfect manner in order that the eye may not suffer when used for reading purposes.

In the attainment of this result I preferably employ shellac or a similar resinous or vegetable gum or product, adding to it a substance of the phenol class which will give it the desired resiliency and toughness for the particular purpose required. This it will be understood may vary within reasonable limits, inasmuch as a compound of 98% of the gum or resinous body with 2% of the phenol will be found to have very great toughness, although being hard and having some tendency to crack under a twisting or similar strain. On the other hand, a compound of 92% of the gum with 8% of the phenol will have a power of enduring almost unlimited twisting or bending without either cracking or breaking.

A very satisfactory adhesive for general purposes may be formed by the use of a compound of about 96% shellac or kindred substance with about 4% carbolic acid, a member of the phenol group, this being one concrete example of the generic principles of my adhesive suitable for wide and general use, which adhesive when in a thin film will be substantially transparent and colorless to be unnoticed by the vision while very firmly and securely uniting together polished glass surfaces or the like to form the double protection lens shown in certain figures of my drawing, or to satisfactorily unite and hold together the two parts of a bifocal lens such as shown in Fig. V of my drawing.

I claim:

An ophthalmic lens comprising a pair of polished glass surfaces and an intermediate cementitious film of appreciable thickness, said film consisting of an adhesive gum combined with a toughener, substantially as and for the purpose described.

In testimony whereof I affix my signature in the presence of a witness.

EDGAR D. TILLYER.

Witness:
   EDITH M. HALVORSEN.